(12) United States Patent
Carlson

(10) Patent No.: US 7,588,221 B1
(45) Date of Patent: Sep. 15, 2009

(54) SUCTION CUP DEVICE

(76) Inventor: Rene C. Carlson, 609 N. Gene Pl., Tucson, AZ (US) 85710

( * ) Notice: Subject to any disclaimer, the term of this patent is extended or adjusted under 35 U.S.C. 154(b) by 0 days.

(21) Appl. No.: 11/860,360

(22) Filed: Sep. 24, 2007

Related U.S. Application Data

(60) Provisional application No. 60/829,650, filed on Oct. 16, 2006.

(51) Int. Cl.
    *F16B 47/00* (2006.01)
(52) U.S. Cl. .............. 248/205.9; 248/206.31
(58) Field of Classification Search .......... 248/206.3, 248/206.4, 205.8, 205.9, 205.7; 224/324, 224/325, 559, 917.5
    See application file for complete search history.

(56) References Cited

U.S. PATENT DOCUMENTS

| | | | | |
|---|---|---|---|---|
| 4,667,428 A | * | 5/1987 | Elmer ........................ | 40/592 |
| 5,242,063 A | * | 9/1993 | Ericksen et al. ............... | 211/65 |
| 5,611,511 A | | 3/1997 | Lee ........................ | 248/205.8 |
| 5,678,793 A | * | 10/1997 | Hill ........................ | 248/206.3 |
| 5,806,816 A | * | 9/1998 | Hull et al. ................. | 248/205.6 |
| 5,918,929 A | | 7/1999 | Vagis ........................ | 296/210 |
| 5,992,806 A | | 11/1999 | Adams .................... | 248/205.8 |
| 6,089,517 A | * | 7/2000 | Johnstone ................ | 248/205.5 |
| 6,318,689 B1 | * | 11/2001 | Rodriguez ............... | 248/311.2 |
| 6,375,143 B1 | | 4/2002 | Burns ........................ | 248/363 |
| 6,446,850 B2 | | 9/2002 | Ming-Shun ................. | 224/324 |
| 6,502,355 B1 | * | 1/2003 | Bori ........................ | 52/202 |
| 6,530,725 B1 | * | 3/2003 | Courtney et al. ............ | 405/186 |
| 6,606,768 B2 | * | 8/2003 | Henry et al. .................. | 24/306 |
| 6,648,285 B1 | | 11/2003 | Woollen .................. | 248/205.8 |
| 6,896,278 B1 | * | 5/2005 | Hepburn ................ | 280/304.3 |
| 7,163,182 B2 | * | 1/2007 | Lee ........................ | 248/205.8 |
| 2005/0023419 A1 | * | 2/2005 | Frankel ..................... | 248/206.3 |

* cited by examiner

*Primary Examiner*—Ramon O Ramirez
(74) *Attorney, Agent, or Firm*—Hayes Soloway P.C.

(57) ABSTRACT

A suction cup device is disclosed comprising a panel 10 having a plurality of suction cups 20, each suction cup having a stem 22 and a release tab 24, said stem being attached to the bottom side of the panel, wherein said panel has two or more slots 30, and wherein a means for fastening a load to said panel may be passed through said slots. The panel also contains notches 50 to allow access to the release tabs 24 of the plurality of suction cups 20.

11 Claims, 4 Drawing Sheets

FIG. 2B
FIG. 2C
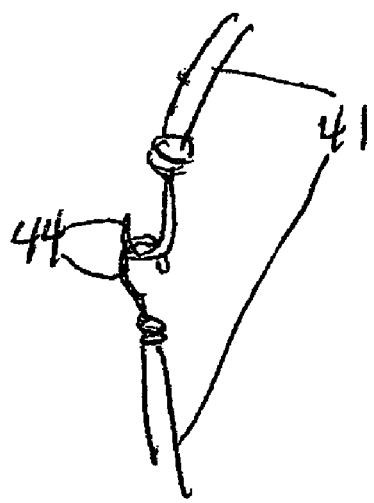

SUCTION CUP DEVICE

CROSS REFERENCE TO RELATED APPLICATIONS

This application claims priority from U.S. Provisional Application Ser. No. 60/829,650 filed Oct. 16, 2006.

BACKGROUND OF THE INVENTION

This invention relates generally to suction cup devices, and specifically relates to suction cup devices for attaching items to smooth surfaces for storage or transport.

BRIEF DESCRIPTION OF THE PRIOR ART

Suction cup devices are used to adhere objects to smooth surfaces. These suction cups generally consist of a stem element, a cup element, and a release element. The stem element is used to attach other objects. The cup element adheres to a smooth surface when a vacuum is created within by pressing down on the suction cup device. The release element may be in the form of a tab, placed on the outside rim of the cup element, wherein pulling on the tab allows air into the cup element, releasing the suction cup device.

Various types of roof racks employing suction cup devices have been proposed in the prior art. For example, U.S. Pat. No. 6,446,850 teaches a convertible ski rack for a car roof which includes two long supports, a pair of supporting suction cups, and a pair of ski holders. Each of the upper and the lower side of the long supports is provided with two longitudinally and parallelly extended channels. Each of the ski holders includes a U-shaped base and two bridge-type retainers. The U-shaped base includes two walls defining a space between them for holding a pair of skis. The two walls of the U-shaped base outward extend to provide two side extensions each having a stopper thereon. Each of the two bridge-type retainers straddles one side extension to locate between the stopper and the wall from which the side extension extends. The supporting suction cups are movably connected at tops to the lower side of the long supports and attached at bottoms to the car roof through vacuum suction. The ski holders are removably connected to the long supports. When the U-shaped bases of the ski holders are removed from the long supports, a plurality of secondary suction cups may be attached to the car roof and connected to the lower side of the long supports and the long supports used to carry heavy pieces of luggage. See, also U.S. Pat. No. 5,611,511; U.S. Pat. No. 5,922,806; U.S. Pat. No. 6,375,143; and U.S. Pat. No. 6,648,285.

However, at highway speeds roof-mounted roof racks may be subjected to very high loads and stresses from aerodynamic forces. Thus, there exists a need for a suction cup device that provides for greater security and stability even at highway speeds.

SUMMARY OF THE INVENTION

The present invention provides a simple suction cup device to attach a load to a smooth surface. The device is easy to operate and will not harm the surface. The invention generally comprises a substrate through which is mounted a plurality of suction cups. The suction cups each have a release tab which is accessible from the top side of the substrate. The substrate has a plurality of slots through which a strap, rope or cord may be threaded for securing a load.

BRIEF DESCRIPTION OF THE DRAWINGS

Further features and advantages of the invention will be seen from the following detailed description, taken in conjunction with the accompanying drawings, wherein like numerals depict like parts, and wherein:

FIG. 2 is a side elevational view of the FIG. 1 device;

FIGS. 2A and 2B are illustrations showing alternative embodiment of the invention;

DETAILED DESCRIPTION OF THE PREFERRED EMBODIMENTS

Figure 1:
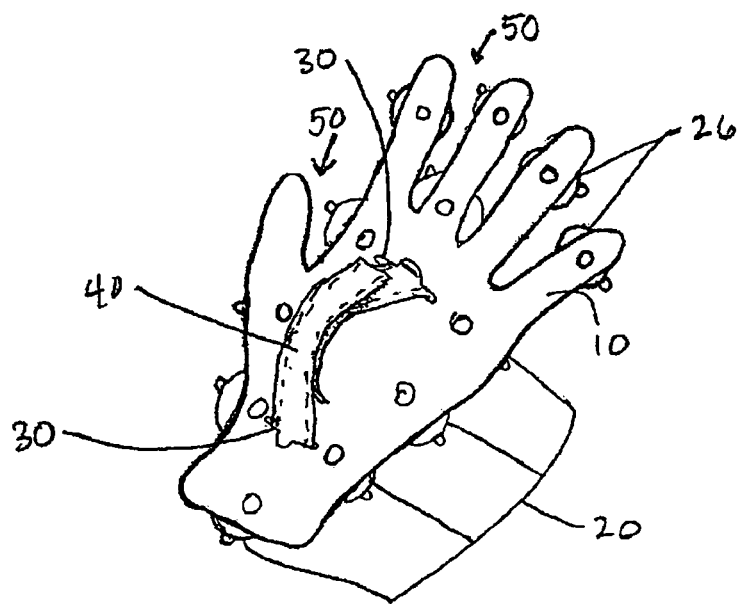
FIG. 1 is a top plan view of one embodiment of a suction cup device in accordance with my invention.
Figure 2A:
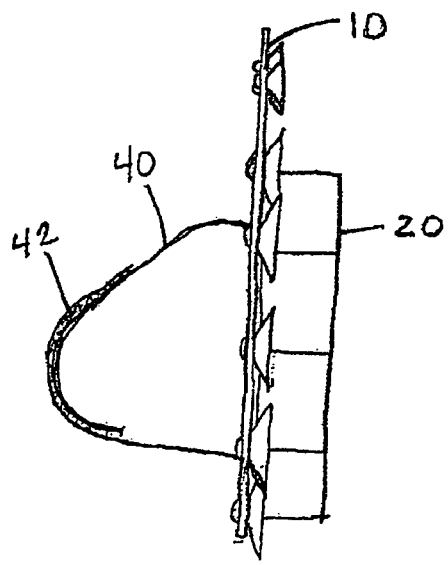
Figure 3:
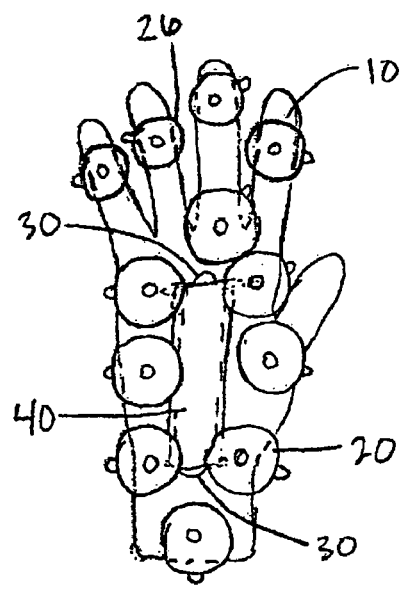
FIG. 3 is a bottom plan view of the FIG. 1 device.
Figure 4:
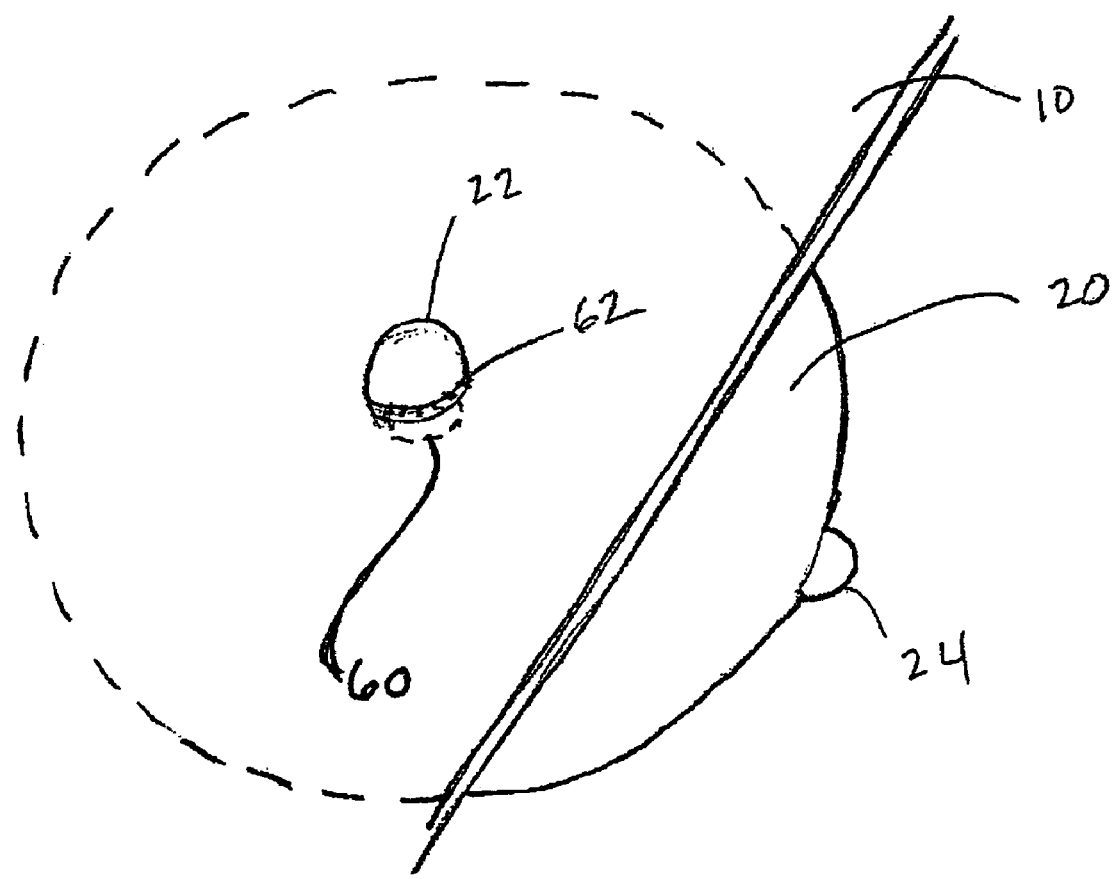
FIG. 4 is an enlarged view of a single suction cup portion of the FIG. 1 device.

Referring to FIGS. 1-4, the suction cup device is comprised of a substrate 10 having a plurality of suction cups 20, each suction cup having a stem 22 and a release tab 24. The suction cups 20 are mounted through holes 60 in the substrate 10, and in one embodiment include serrated washers such as C-lock washers 62 to prevent the suction cups 20 from turning so that the release tab remains accessible. Alternatively, the head stems 22 may be flattened snuggly to prevent the suction cups 20 from turning, i.e. by friction. Two or more slots 30 are formed through substrate 10 through which a rope, cord or strap 40 may be threaded for fastening a load to the device.

Substrate 10 may be constructed of plastic, metal, fiberglass, or wood and may be rigid or slightly flexible so that the device may be attached to a slightly curved surface as is commonly found on car roofs. The substrate is shaped to allow access to the release tabs 24 on the suction cups 20, and may include notches 50 to allow access to the release tabs 24 on the suction cups 20. The suction cups 20 may all be the same size, or suction cups 20, 26 of different size may be used. The shape of the substrate 10 and the placement of the suction cups are chosen to distribute the weight and forces across the device.

Figure 5:
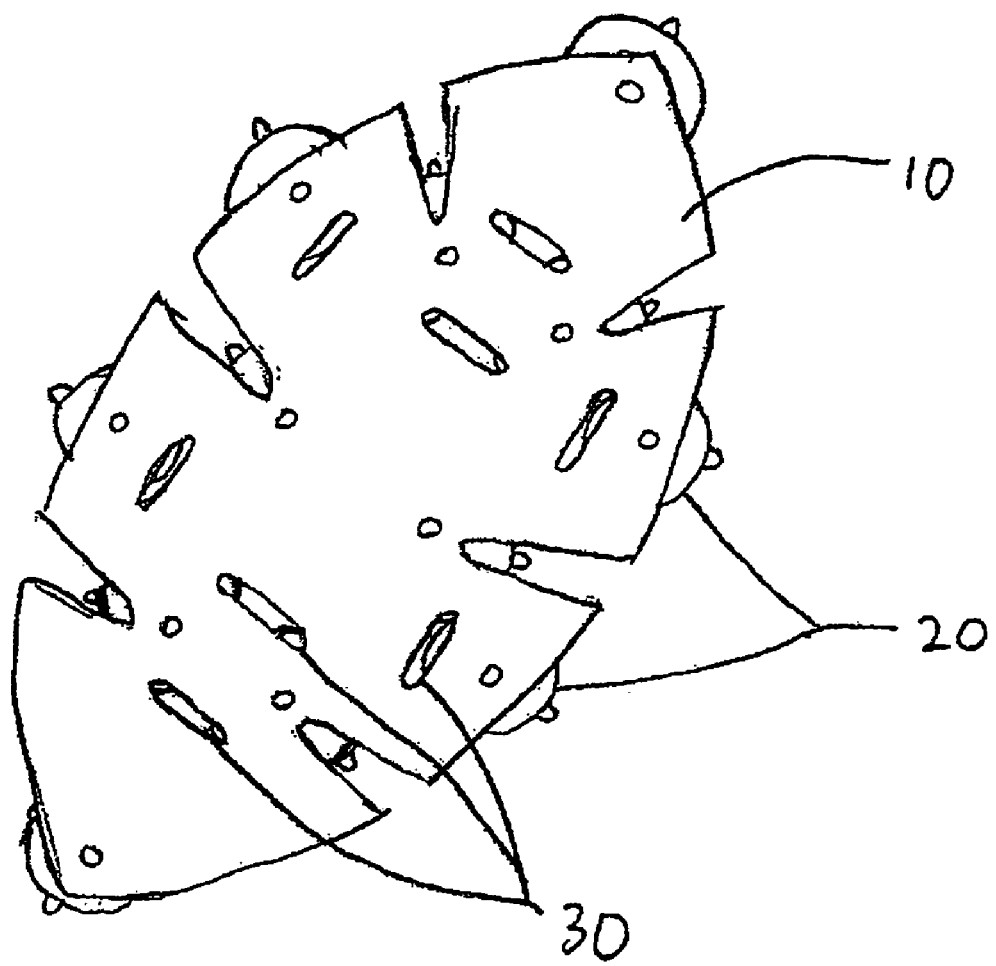
FIG. 5 is a view similar to FIG. 1 of an alternative embodiment of my invention.

Two or more slots 30 are formed through the substrate 10 through which a rope, cord or strap 40 may be threaded for holding down a load. Referring to FIG. 1, preferably the strap comprises a nylon strap 40 having hook and loop fasters 42 for permitting easy loading and unloading and adjustment of the length of the strap 40. An alternative embodiment of my device is shown in FIG. 5 in which all of the suction cups 20 are the same size. In this embodiment, the substrate 10 has eight slots for accommodating one or more straps 40 for holding different size and shape loads. As in the case of the FIG. 1 embodiment, substrate 10 is shaped to permit access to the suction cup release tabs 24.

As noted supra, in a preferred embodiment the suction cups 20 are prevented from rotating by C-lock washers 62 so that the release tabs 24 are always accessible.

The device may be placed on any flat or slightly curved, smooth surface. Some examples of suitable surfaces are windows and car roofs. In use, the suction cup device is pressed against the flat or nearly flat surface, causing the expression of the air in the suction cups. When properly placed, the force holding the suction cup device and load in place is proportional to the total area of the plurality of suction cups. To release the device from the surface, the user pulls the individual release tabs 24 on the suction cups.

Although the preceding detailed description has provided several embodiments of a suction cup device, alternatives are possible without departing substantially from the spirit and principles of the invention. For example, the device may be used to hold loads against a wall, e.g., for storage. Also, the strap 40 may be adjustable in length and include a slide buckle, belt buckle 43 or the like. The device also may be packaged as a kit with a plurality of different length straps. The strap also may comprise an elastic strap such as a bungee cord 41 having hooks 44 or the like at its respective ends. All such modifications and variations are intended to be included herein within the scope of this disclosure and the present invention and protected by the following claims.

What is claimed is:

1. A suction cup device for mounting to a surface and for attaching a separate load thereto, said device comprising a substrate having a plurality of suction cups mounted therethrough, each suction cup having a stem and a release tab wherein each said release tab is accessible when the device is mounted to a surface, said substrate also having two or more slots therethrough, wherein the device further comprises a rope, cord, or strap threaded through said slots, said rope, cord or strap having mating ends for attaching to one another for holding said separate load securely to the substrate.

2. A suction cup device according to claim 1, wherein said substrate is shaped and sized to provide access to said release tabs.

3. A suction cup device as claimed in claim 2, wherein the substrate is shaped to include at least one notch, and wherein at least one of said release tabs is accessible through the at least one notch when the device is mounted to a surface.

4. A suction cup device according to claim 1, wherein said strap comprises an adjustable length strap having a slide buckle or belt buckle.

5. A suction cup device according to claim 1, wherein said strap comprises a bungee cord having hooks at each end.

6. A suction cup device as claimed in claim 1, wherein each suction cup is held in said substrate by a lock washer.

7. A suction cup device as claimed in claim 1, wherein the suction cups are all the same size.

8. A suction cup device as claimed in claim 1, wherein the suction cups are two or more different sizes.

9. A suction cup device as claimed in claim 1, wherein each suction cup is held in said substrate by flattening the head of the stem.

10. A kit comprising a suction cup device as claimed in claim 1, and at least one hold down strap for threading through slots in the substrate.

11. A suction cup device according to claim 1, wherein said strap includes hook and loop fasteners.

\* \* \* \* \*